(12) United States Patent
Zou

(10) Patent No.: US 9,912,853 B2
(45) Date of Patent: Mar. 6, 2018

(54) SWITCHING BETWEEN CAMERAS OF AN ELECTRONIC DEVICE

(71) Applicant: Microsoft Technology Licensing, LLC, Redmond, WA (US)

(72) Inventor: Deyu Zou, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/503,004

(22) Filed: Sep. 30, 2014

(65) Prior Publication Data

US 2016/0037037 A1 Feb. 4, 2016

(30) Foreign Application Priority Data

Jul. 31, 2014 (CN) .......................... 2014 1 0370821

(51) Int. Cl.
*H04N 5/225* (2006.01)
*H04N 5/232* (2006.01)
*H04N 13/02* (2006.01)

(52) U.S. Cl.
CPC .......... *H04N 5/2258* (2013.01); *H04N 5/232* (2013.01); *H04N 5/23216* (2013.01)

(58) Field of Classification Search
CPC ...... H04N 13/0239; H04N 9/045; H04N 9/09; H04N 5/2258; H04N 5/23245; H04N 1/00307
USPC ........... 348/211.11, 47, 218.1, 222.1, 42, 48, 348/220.1, 231.99, 262, 374, 376; 14/211.11, 47, 218.1, 222.1, 42, 48, 14/220.1; 455/556.1
See application file for complete search history.

(56) References Cited

U.S. PATENT DOCUMENTS 6,262,768 B1 7/2001 Williams
6,731,334 B1 5/2004 Maeng et al.
8,451,312 B2 5/2013 Lee et al.
(Continued)

FOREIGN PATENT DOCUMENTS

CN 102638646 A 8/2012
EP 2712156 A1 3/2014
EP 2753072 A2 7/2014
WO 2012153228 A1 11/2012

OTHER PUBLICATIONS

F. Alan, "Turn your Rear-Facing Camera into a Front-Facing one with Vainworks", Published on: Jan. 3, 2011, Available at: http://www.phonearena.com/news/Turn-your-rear-facing-camera-into-a-front-facing-one-with-Vainworks_id15672.
(Continued)

*Primary Examiner* — Xi Wang

(57) ABSTRACT

The subject matter described herein relates to switching between cameras of an electronic device. A method, system and computer storage medium are provided for switching between cameras of an electronic device. In an embodiment, the method comprises detecting at least a partial obstruction of a camera of the electronic device; and upon detection, switching between the at least partially obstructed camera and another camera of the electronic device. In such a way, it enables a user to switch between two different cameras by simply at least partially obstructing one of the cameras using, for example, a finger, which improves the accuracy of user operations and enhances usability of the electronic device, thereby providing a better user experience.

20 Claims, 3 Drawing Sheets

(56) References Cited

U.S. PATENT DOCUMENTS

| | | | | |
|---|---|---|---|---|
| 2004/0012682 A1* | 1/2004 | Kosaka | | H04N 5/335 |
| | | | | 348/207.99 |
| 2011/0242286 A1* | 10/2011 | Pace | | H04N 13/0025 |
| | | | | 348/47 |
| 2012/0050530 A1 | 3/2012 | Raman et al. | | |
| 2012/0051732 A1* | 3/2012 | Aoki | | G03B 35/10 |
| | | | | 396/374 |
| 2012/0074006 A1* | 3/2012 | Monaco | | H04M 1/15 |
| | | | | 206/320 |
| 2012/0100888 A1* | 4/2012 | Kim | | H04M 1/72569 |
| | | | | 455/556.1 |
| 2012/0120186 A1* | 5/2012 | Diaz | | H04N 5/2258 |
| | | | | 348/36 |
| 2013/0258270 A1* | 10/2013 | Cazalet | | G02C 11/10 |
| | | | | 351/114 |
| 2014/0362257 A1* | 12/2014 | Viljamaa | | H04N 5/2251 |
| | | | | 348/231.99 |
| 2015/0009282 A1* | 1/2015 | Mai | | H04N 7/147 |
| | | | | 348/14.12 |

OTHER PUBLICATIONS

You, et al., "CarSafe: A Driver Safety App that Detects Dangerous Driving Behavior using Dual-Cameras on Smartphones", In Proceedings of ACM Conference on Ubiquitous Computing, Sep. 5, 2012, 2 pages.

Jalil, Mohammed, "Video Camera Flip", Retrieved on: Jul. 15, 2014, Available at: http://dandy.co/apps/video-camera-flip/.

"International Search Report & Written Opinion for PCT Patent Application No. PCT/US2015/042558", dated Oct. 22, 2015, Filed Date: Jul. 29, 2015, 10 Pages.

"International Preliminary Report on Patentability Issued in PCT Application No. PCT/US2015/042558", dated Oct. 21, 2016, 8 Pages.

"International Search Report & Written Opinion for PCT Patent Application No. PCT/US2015/042558", dated Jun. 10, 2016, 7 Pages.

* cited by examiner

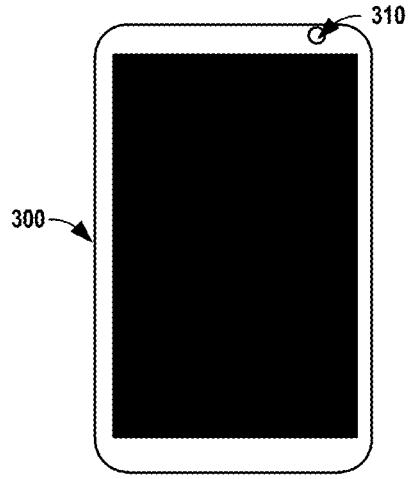
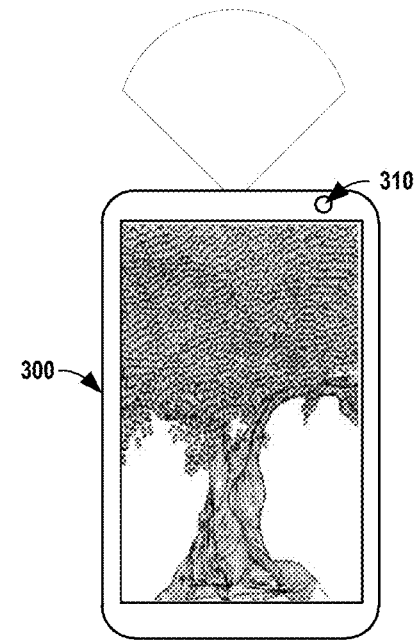
FIG. 3G  FIG. 3H
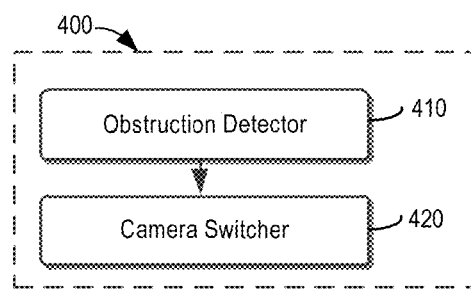
FIG. 4

SWITCHING BETWEEN CAMERAS OF AN ELECTRONIC DEVICE

RELATED APPLICATIONS

This application claims priority to Chinese Application No. 201410370821.4, filed on Jul. 31, 2014, and entitled "SWITCHING BETWEEN CAMERAS OF AN ELECTRONIC DEVICE." This application claims the benefit of the above-identified application, and the disclosure of the above-identified application is hereby incorporated by reference in its entirety as if set forth herein in full.

BACKGROUND

Recently, an electronic device such as mobile phone, tablet, etc., is more and more popular all over the world and more and the electronic device is provided with more appealing functionalities. For example, currently, many electronic devices are configured with more than one camera, typically a front camera and a back camera, for easy use by users. In such a way, it can enable a user to take a self-shot using the front camera and take a photo of scene before them using the back camera.

In a traditional solution, the two cameras are often switched by pressing a switching icon or menu in a user interface as provided on screen of the electronic device. The switching icon or menu is usually located, for example, on one side, or on top of the image and is very small so that it will not affect viewing of the image in view finder monitor. The small size of the switching icon or menu means that it is not easy to press it accurately. Furthermore, for a people with big fingers, it will be even more difficult for them to switch between two cameras by pressing the switching icon or menu. Accordingly, the user might have a bad experience.

SUMMARY

Embodiments of the subject matter described herein generally relate to switching between cameras of an electronic device to improve user experience.

An embodiment provides method implemented at least in part by an electronic device comprising: detecting at least partially obstruction of a camera of the electronic device; and upon detection, switching between the at least partially obstructed camera and another camera of the electronic device.

Another embodiment provides a system in an electronic device. The system comprises: an obstruction detector configured to detect at least partially obstruction of a camera of the electronic device; and a camera switcher configured to, upon detection, switch between the at least partially obstructed camera and another camera of the electronic device.

Yet another embodiment provides a computer storage medium having computer-executable instructions, which when executed perform actions comprising: detecting at least partially obstruction of a camera of the electronic device; and upon detection, switching between the at least partially obstructed camera and another camera of the electronic device.

In accordance with embodiments of the subject matter described herein, at least a partial obstruction of a camera of an electronic device is detected, instead of detecting pressing of the switching menu or icon in a user interface. If the at least a partial obstruction of the camera is detected, it will switch between cameras. In such a way, it enables a user to switch between different cameras by simply at least partially obstructing one of the cameras by for example a finger, which improves the accuracy of user operation and enhances usability of the electronic device, thereby bring a better user experience.

It is to be understood that this Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A to 3H schematically illustrates an example of user operations during switching between front and back cameras of an electronic device in accordance with embodiments of the subject matter described herein; and FIG. 4 schematically illustrates a block diagram of a system for switching between cameras of an electronic device in accordance with embodiments of the subject matter described herein.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
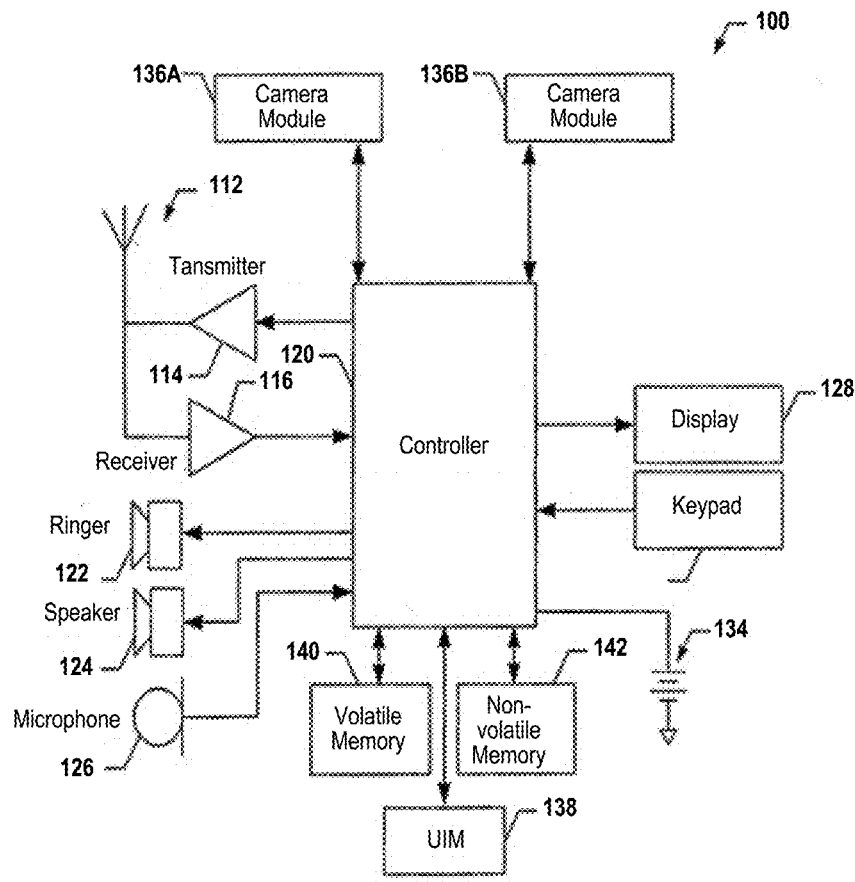
FIG. 1 schematically illustrates a block diagram of an electronic device in which embodiments of the subject matter described herein may be implemented.

FIG. 1 illustrates a block diagram of an electric device 100 in accordance with an embodiment of the subject matter described herein. The electronic device 100 may be a mobile device with more than one camera, such as a smart phone. However, it is to be understood that any other types of electronic devices with more than one cameras may also easily adopt embodiments of the subject matter described herein, such as a portable digital assistant (PDA), a pager, a mobile computer, a mobile TV, a game apparatus, a laptop, a tablet computer, a camera, a video camera, a GPS device, and other types of electronic devices with at least two cameras.

The electronic device 100 comprises one or more antennas 112 operable to communicate with the transmitter 114 and the receiver 116. The electronic device 100 further comprises at least one controller 120. It should be understood that the controller 120 comprises circuits or logic required to implement the functions of the electronic device 100. For example, the controller 120 may comprise a digital signal processor, a microprocessor, an A/D converter, a D/A converter, and/or any other suitable circuits. The control and signal processing functions of the electronic device 100 are allocated in accordance with respective capabilities of these devices.

The electronic device 100 may further comprise a user interface, which, for example, may comprise a ringer 122, a speaker 124, a microphone 126, a display 128, and an input interface 130, and all of the above devices are coupled to the controller 120. The electronic device 100 may further comprise camera modules 136A and 136B for capturing static and/or dynamic images, for example a front camera 136A for self-shot and a back camera 136B for a normal shot.

The electronic device 100 may further comprise a battery 134, such as a vibrating battery set, for supplying power to various circuits required for operating the electronic device 100 and alternatively providing mechanical vibration as detectable output. In an embodiment, the electronic device 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The electronic device 100 further comprises a memory. For example, the electronic device 100 may comprise a volatile memory 140, for example, comprising a volatile random access memory (RAM) in a cache area for temporarily storing data. The electronic device 100 may further comprise other non-volatile memory 142 which may be embedded and/or movable. The non-volatile memory 142 may additionally or alternatively include for example, EEPROM and flash memory, etc. The memory 140 may store any item in the plurality of information segments and data used by the electronic device 100 so as to implement the functions of the electronic device 110. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or reduced as required.

Embodiments of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

As mentioned hereinbefore, the existing solution for switching between cameras give a poor user experience and thus in the subject matter described herein, there is proposed a new solution for switching between different cameras. Hereinbelow, reference will be made to FIGS. 2 to 4 to describe the solution as provided in the subject matter in detail.

Figure 2:
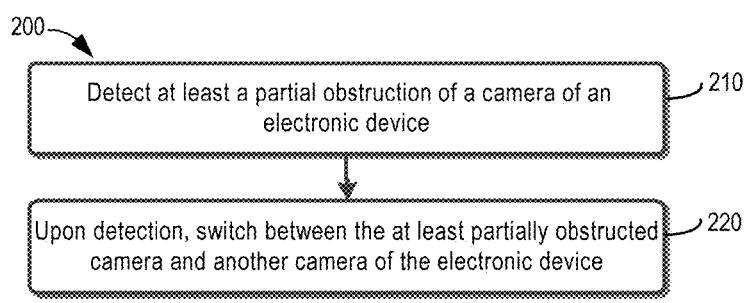
FIG. 2 schematically illustrates a flowchart of a method for switching between cameras of an electronic device in accordance with embodiments of the subject matter described herein.

FIG. 2 shows a flowchart 200 of a method that is implemented at least in part by an electronic device for switching between cameras of an electronic device. It is to be understood that the steps are not necessarily performed in the order shown in FIG. 2; instead those steps may be performed in any other suitable order or in parallel.

First, as illustrated in flowchart 200, at step 210, detecting of at least a partial obstruction of a camera of an electronic device is performed.

In the subject matter described herein, it proposes to switch between cameras by at least partially obstructing, for example covering or pressing, a camera with a finger instead of pointing onto a switching menu or icon on screen of the electronic device. Thus, it requires detecting at least a partial obstruction of a camera of the electronic device. The at least a partial obstruction of a camera may be detected only when a camera is being used.

The detecting of at least a partial obstruction of a camera may be implemented by various approaches and herein, only for illustration purpose, some example embodiments will be described.

In an embodiment, an abrupt decrease in the amount of light entering the camera is sensed. It can be understood that if a camera is obstructed by a user, the amount of light entering the camera, specifically a lens of the camera will be decreased greatly. Thus, by mean of the amount of light entering the camera, it may determine whether the camera is obstructed or not. It is known that, in an existing electronic device, the amount of light entering the camera usually will be calculated as an imaging parameter frequently when the view finder monitor is operating. Thus, it is possible to just fetch values of the parameter and use these values to determine whether there is an abrupt decrease in the amount of light entering the camera. In addition, the skilled in the art may also understand that it is also possible to calculate the amount of light entering the camera additionally and independently for use of abrupt decrease sensing of light entering the camera.

In another embodiment, it may also detect the at least a partial obstruction of a camera by identifying a predetermined imaging pattern of the camera. It is noticed that if a camera is obstructed by a user, the electronic device will render a predetermined imaging pattern. For example, some electronic devices will render a black image in the view finder monitor when the camera is obstructed by a finger, and some other electronic devices will render a black image when the environment light is not weak and render an orange-red image if the environment light is strong because there might be light going into the camera through the finger and the semi-transparent body component with blood vessels causes the orange-red color. In addition, it is also possible that electronic devices from different devices manufactures renders different color images; however, it will be not difficult for the skilled in the art to identify the predetermined color image indicating at least a partial obstruction of a camera for a specific type of electronic device.

In addition, a predetermined time threshold T may be used to improve the accuracy of detecting at least a partial obstruction of the camera. In fact, there might be cases other than at least a partial obstruction of a camera but showing similar characteristics to at least a partial obstruction of a camera, for example, the user moving the electronic device into a dark environment, or sudden change of environment such as turning a lamp off, etc. To identify the case of at least a partial obstruction of a camera more accurately, the predetermined time threshold T may be set as substantially corresponding to the time for a normal user obstructing the camera with his/her finger. Besides, it is a frequently occurring case that the user moves an electronic device from a light environment to a dark environment, and it is possible to identify it as the at least a partial obstruction of a camera, which is undesirable. Therefore, to distinguish this case from that of at least a partial obstruction of a camera of the electronic device, the predetermined time threshold T may be set as shorter than a normal time interval for moving a camera from a light environment to a dark environment, for example one second or other suitable time threshold. In such a case, if the at least a partial obstruction of a camera is detected by sensing the abrupt decrease in the amount of light entering the camera, the at least a partial obstruction of a camera of the electronic device will be detected only if the abrupt decrease occurs within the predetermined time threshold T; if the at least a partial obstruction of a camera is detected by identifying the predetermined imaging pattern of the camera, the at least a partial obstruction of a camera of the electronic device will be detected only if an change from a normal imaging pattern to the predetermined imaging pattern occurs within the predetermined time threshold T. By doing this, it can improve the accuracy of obstruction detection and thus further improve the user experience.

Only for illustration purpose, detailed implementation of identifying a predetermined imaging pattern will be described in detail so that the skilled in the art could easily implement the subject matter as described herein. However, it should be appreciated that the subject matter as described herein is not limited thereto, and any other suitable specific implementation can also be used for detecting obstruction of a camera.

In an embodiment of the present disclosure, $P(x, y, t)$ is used to represent a single pixel of imaging result $I(t)$ at time point t with the coordinate of $(x, y)$ and $P_{uv}(x, y, t)$ and $P_{grey}(x, y, t)$ are respectively used to represent the chrominance value and luminance value of P. Parameter pixNum, freshPixNum and darkPixNum are used to present the number of total image pixels, the total number of fresh pixels and the total number of dark pixels, respectively. In addition, parameter freshRatioTh is used to presents fresh pixel ratio threshold for at least partially obstructing a lens by finger and palm, parameter darkRatioTh is used to present dark pixel ratio threshold for at least partially obstructing a lens by finger and palm. Then based on the above parameters, an example detection logic for image $I(t)$ can be defined as follows:

| Detection Logic for Image I (t) |
| --- |
| freshPixNum(t) = 0, darkPixNum(t) = 0;<br>　for each pixel of I (t):<br>　　If $P_{uv}$ (x, y, t) belong to fleshtone color zone,<br>　　　freshPixNum(t)++;<br>　　If $P_{grey}$ (x, y, t) < $Th_{grey}$ , darkPixNum(t)++;<br>　freshRatio(t) = freshPixNum(t)/pixNum;<br>　darkRatio(t) = darkPixNum(t)/pixNum;<br>　If freshRatio(t) > freshRatioTh<br>　　If ((freshRatio(t−T) < freshRatioTh) && ((freshRatio(t) − freshRatio(t−T)) > freshRationTh))<br>　　　I (t) is an obstruction case;<br>　　else<br>　　　I (t) is not an obstruction case;<br>　else if darkRatio(t) > darkRatioTh |

| Detection Logic for Image I (t) |
| --- |
| 　　If ((darkRatio(t−T) < darkRatioTh) && ((darkRatio(t) − darkRatio(t−T)) > darkRationTh))<br>　　　I (t) is an obstruction case;<br>　　else<br>　　　I (t) is not an obstruction case;<br>End detection for I (t) |

In addition to the above-mentioned detection approaches, the detection of the at least a partial obstruction of a camera may also be implemented by means of hardware. In a further embodiment, the obstruction of a camera is detected by means of a touch sensor obstructing at least partially the camera. That is to say, in such a case, over each of cameras, there might be additionally arranged a touch sensor. When the user obstructs the camera by putting his finger onto a lens of the camera, the touch sensor will sense the touching and send a signal to the processor. Thus, by means of the touch sensor, it may detect the at least a partial obstruction of a camera easily. However, it can be appreciated that in such a solution, it requires to amend the hardware design of the electronic device.

Once the at least a partial obstruction of a camera is detected, then at step S220, the switching between the at least partially obstructed camera and another camera may be performed.

Once the at least a partial obstruction of the camera by a user is detected, it may switch between cameras. For example, if the user puts his/her finger on a currently used camera, which might mean he/she did not want to use the current used camera any more, and thus in such a case, it may switch from the at least partially obstructed camera to another camera of the electronic device.

On the other hand, the user might also put his/her finger on another camera that is not used currently to indicate a camera that he/she would like to use. So in such a case, it may switch to the at least partially obstructed camera from another camera of the electronic device. It may be appreciated that it is easy to be implemented for a solution detecting the at least a partial obstruction of a camera by means of touch sensor; however, for solutions of sensing the amount of light entering the camera and identify a predetermined imaging pattern, the electronic device shall have at least a functionality that enable light entering into a camera even if the camera is not used. In such a case, it may sense the amount of light entering the camera or identify the predetermined imaging pattern even if no image of this camera is displayed in the screen. It can be appreciated that this scheme is a little more complex than that of taking the at least partially obstructed camera as the one that a user does not want to use, but technically, it can be implemented by amending software in the camera module and it may also bring a good user experience by putting his/her finger on the desirable camera directly.

Specific implementations of switching between two cameras are already known in the prior art, for example in solution of switching cameras by means camera switching menu or icon. Therefore, they will not be elaborated herein for a purpose of not obscuring the spirit of the subject matter as described herein.

In such a way, switching cameras of the electronic device only requires user to put his/her fingers or something like that on a camera, which could provide a simple and better solution for a user. Accordingly, the embodiments of the subject matter as described herein may improve the accuracy of user operation and enhance usability of the electronic device, thereby offering a better user experience.

FIGS. 3A to 3H schematically illustrate an example of user operations during switching between front and back camera of an electronic in accordance with embodiments of the subject matter described herein. However, it should be appreciated that, they are illustrated only for illustration purpose and the subject matter as described herein is not limited thereto. Hereinafter, detailed description will be made to user operations during camera switching with reference to FIGS. 3A to 3H.

Figures 3A, 3B, 3C:
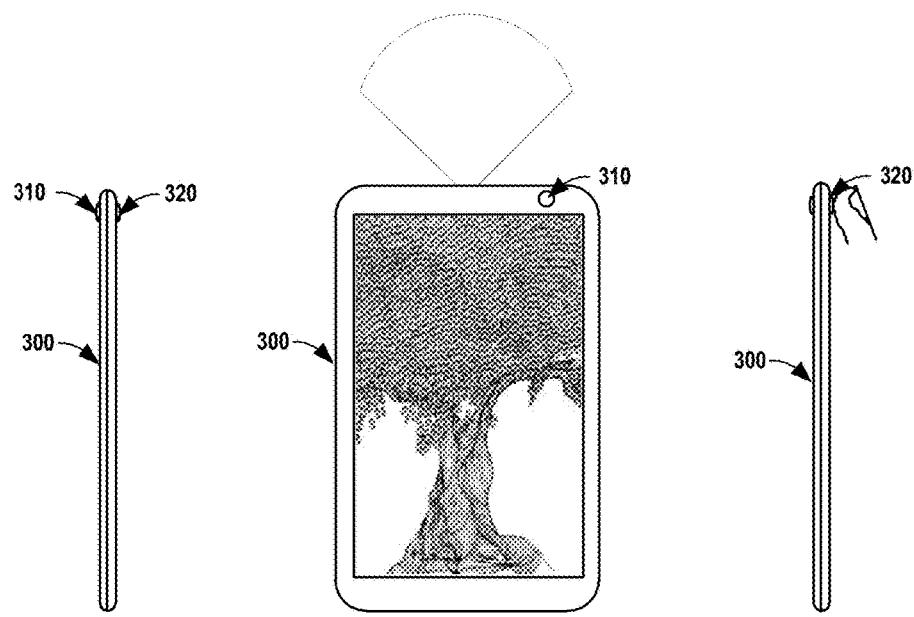
Figures 3D, 3E, 3F:
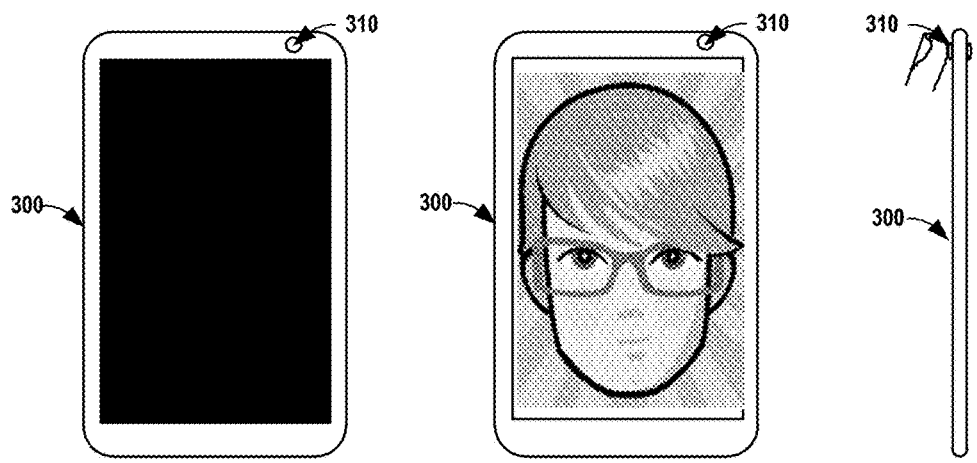

First, in FIG. 3A is illustrated an electronic device 300 with two cameras, i.e., a front camera 310 and a back camera 320. When the back camera is used, it will capture a normal image of scene before the user, as schematically illustrated in FIG. 3B. When the user wants to switch to the front camera so that he/she could take a self-shot, he/she may for example use his/her finger to obstruct the currently used camera 320 as illustrated in FIG. 3C. Then, due to that fact that the camera 320 is obstructed, the amount of light entering the camera will be decreased, as illustrated in FIG. 3D, and the screen might render a predetermined image pattern that indicates the at least a partial obstruction of the camera 320. After the at least a partial obstruction of the camera 320 is detected by, for example, sensing an abrupt decrease in the amount of light entering the camera, identifying the predetermined imaging pattern, or sensing a touching of the camera by means of a touch sensor obstructing at least partially a lens of the camera, the switching from the at least partially obstructed camera 320 to the front camera 310 will be performed. Thus, as illustrated in FIG. 3E, the user could use the front camera 310 to take a self-shot. On the other hand, if the user obstructs the lens of the front camera as illustrated in FIG. 3F, the amount of light entering the camera will be decreased and the screen might render a predetermined image pattern as illustrated in FIG. 3G. After such an obstruction of the camera 310 is detected, it may automatically switch from the front camera to the back camera again, as illustrated in FIG. 3H.

Besides, FIG. 4 illustrates a block diagram of a system for switching between cameras in accordance with embodiments of the subject matter described herein. As illustrated in FIG. 4, the system 400 comprises an obstruction detector 410 and a camera switcher 420. The obstruction detector 410 is configured to detect at least a partial obstruction of a camera of the electronic device. The camera switcher 420 is configured to switch between the camera and another camera of the electronic device if the at least a partial obstruction of the camera is detected.

In an embodiment of the subject matter described herein, the obstruction detector 410 may be further configured to detect at least a partial obstruction of a camera of the electronic device by for example sensing an abrupt decrease in the amount of light entering the camera. As mentioned before, if a camera is covered by a finger, there will be an abrupt decrease in amount of light entering the camera. Thus, through sensing the amount of light entering the camera and find the abrupt decrease therein, it can detect the at least a partial obstruction of the camera of the electronic device.

In another embodiment of the subject matter described herein, the obstruction detector 410 may be further configured to detect at least a partial obstruction of a camera of the electronic device by identifying a predetermined imaging pattern of the camera. It is discovered that the camera will render a predetermined imaging pattern if the camera is obstructed. For example, some electronic devices will render a black image, a red-orange image, or other predetermined color image that indicates the at least a partial obstruction of camera of the electronic device. Accordingly, by identifying the predetermined imaging pattern of the camera, the at least a partial obstruction of a camera of the electronic device can be detected.

In a further embodiment of the subject matter, the obstruction detector 410 may be further configured to detect at least a partial obstruction of a camera of the electronic device by sensing a touching of the camera by a touch sensor obstructing at least partially a lens of the camera. As mentioned before, an additionally touch sensor may be provided at least partially over the camera, especially over a lens of the camera, so that the touch sensor may sense the touching of the lens. In such a way, the at least a partial obstruction of the camera may be detected by sensing the touch of the camera by means of touch sensor.

Besides, in order to improve accuracy of camera obstruction detection accuracy, a predetermined time threshold may be used. This predetermined time threshold may be set as a value substantially corresponding to the time for a normal user obstructing the camera with his/her finger. And especially, the predetermined time threshold may be shorter than a normal time interval for moving a camera from a light environment to a dark environment so as to exclude a case that environment change rendering similar characteristic to the at least a partial obstruction of a camera is wrongly taken as the at least a partial obstruction of a camera. That is to say, in such a case, only if the abrupt decrease in the amount of light entering the camera or a change from a normal image to a predetermined imaging pattern of the camera occurs within the predetermined time threshold, it will determine that the at least a partial obstruction of a camera of the electronic device is detected.

In an embodiment of the subject matter as described herein, the camera switcher 420 may be configured to switch from the at least partially obstructed camera to another camera of the electronic device. In such a way, if a user does not want to use the currently used camera, he/she might obstruct this camera, and then the camera switcher will cause the electronic device to switch to the another available camera not being obstructed.

In another embodiment of the subject matter as described herein, the camera switcher 420 may be configured to switch to the obstructed camera from another camera of the electronic device. That is to say, the user can just point out the camera that he/she wants to use by at least partially obstructing this camera through putting his/her finger thereon, and then the camera switcher will cause the electronic device to switch from the currently used camera to the camera onto which the user points.

In addition, in the subject matter described herein, there is also provided a computer storage medium having computer-executable instructions, which when executed perform actions according to the method as described hereinbefore with reference to FIG. 2 to FIG. 3H. For a purpose of simplification, these actions will be not be elaborated herein, for details about these action, reference may be made to the description with reference to FIG. 2 to FIG. 3H.

Hereinbefore, specific embodiments of the subject matter have been described; however, it should be appreciated that all of these embodiments are presented only for illustration purpose and the subject matter are not limited thereto. In fact, from the teachings provided herein, the skilled in the art will conceive various modifications or variations without departing the spirit of the subject matter described herein.

For example, in embodiments of the subject matter as described herein, reference is mainly made to a mobile device, specifically a cellar phone; however, it should be appreciated that the subject matter described herein is not limited thereto, and it may be also applied to other types of electronic devices with at least two cameras, such as a PDA, a pager, a mobile computer, a mobile TV, a game apparatus, a laptop, a tablet computer, a camera, a video camera, a GPS device, etc. Besides, hereinbefore, the electronic devices are mainly described as including two cameras but in fact the subject matter described herein may also be used in an electronic device with more than two cameras and the cameras are not only limited to back and front cameras. Moreover, the user may also use other tools than a finger to obstruct the camera, for example a capacitance pen for the electronic device, or any suitable types of tool capable of obstructing the cameras. It should be appreciated that all these modifications or variations should be included within the scope of the subject matter described herein and the scope of the subject matter described herein is only defined by the claims appended hereinafter.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method implemented at least in part by an electronic device, comprising:
   detecting at least a partial obstruction of a first camera of the electronic device;
   based upon detecting the at least the partial obstruction of the first camera of the electronic device, switching from a second camera to the first camera of the electronic device;
   the detecting comprising at least one of:
     sensing an abrupt decrease in an amount of light entering the first camera; or
     sensing a touching of the first camera by a touch sensor arranged to detect a user touching a lens of the first camera; and
   either:
     the first camera being a front facing camera and the second camera being a rear facing camera; or
     the first camera being a rear facing camera and the second camera being a front facing camera.

2. The method of claim 1, wherein detecting the at least the partial obstruction of the first camera of the electronic device further comprises detecting a predetermined imaging pattern and the predetermined imaging pattern comprises a predetermined color image indicating the at least the partial obstruction of the first camera.

3. The method of claim 1, wherein the at least the partial obstruction of the first camera of the electronic device is detected if the abrupt decrease in the amount of light entering the first camera or a change from a normal image to a predetermined imaging pattern occurs within a predetermined time threshold.

4. The method of claim 3, wherein the predetermined time threshold is shorter than a normal time interval for moving a camera from a light environment to a dark environment.

5. The method of claim 1, wherein the detecting further comprises detecting a particular color based on blood vessels of a body component.

6. The method of claim 1, wherein the detecting is enabled when the first camera and the second camera are not in use.

7. The method of claim 1, wherein the second camera was initially selected prior to switching from the second camera to the first camera.

8. In an electronic device, a system comprising:
   at least two cameras arranged to capture at least two scenes;
   an obstruction detector configured to detect at least a partial obstruction of a camera of the at least two cameras of the electronic device;
   wherein detecting the at least the partial obstruction of the camera of the electronic device comprising at least one of:
      sensing an abrupt decrease in an amount of light entering the camera; or
      sensing a touching of the camera by a touch sensor arranged to detect a user touching a lens of the camera; and
   a camera switcher configured to, upon the detection of the at least the partial obstruction of the camera of the electronic device, switch from a second camera of the at least two cameras to the camera of the electronic device.

9. The system of claim 8, wherein detecting the at least the partial obstruction of the camera of the electronic device further comprises detecting a predetermined imaging pattern and the predetermined imaging pattern comprises a predetermined color image indicating the at least the partial obstruction of the camera.

10. The system of claim 8, wherein the at least the partial obstruction of the camera of the electronic device is detected if the abrupt decrease in the amount of light entering the camera or a change from a normal image to a predetermined imaging pattern occurs within a predetermined time threshold.

11. The system of claim 10, wherein the predetermined time threshold is shorter than a normal time interval for moving a camera from a light environment to a dark environment.

12. The system of claim 8, wherein the camera switcher is configured to switch from the second camera of the electronic device that is not partially obstructed.

13. The system of claim 8, wherein detecting the at least the partial obstruction of the camera of the electronic device further comprises detecting a particular color based on blood vessels of a body component.

14. The system of claim 8, wherein detecting the at least the partial obstruction of the camera of the electronic device is enabled when the camera and the second camera are not in use.

15. A computer storage medium, the computer storage medium being hardware, comprising:
   computer-executable instructions to detect at least a partial obstruction of a first camera of an electronic device, wherein detecting the at least the partial obstruction of the first camera of the electronic device comprising at least one of:
      sensing an abrupt decrease in an amount of light entering the first camera; or
      sensing a touching of the first camera by a touch sensor arranged to detect a user touching a lens of the first camera; and
   computer-executable instructions to, upon the detection of the at least the partial obstruction of the first camera of the electronic device, switch from a second camera to the first camera of the electronic device, the first camera and the second camera being on opposite sides of the electronic device.

16. The computer storage medium of claim 15, wherein detecting the at least the partial obstruction of the first camera of the electronic device further comprises detecting a predetermined imaging pattern and the predetermined imaging pattern comprises a predetermined color image indicating the at least the partial obstruction of the first camera.

17. The computer storage medium of claim 15, wherein the at least the partial obstruction of the first camera of the electronic device is detected if the abrupt decrease in the amount of light entering the first camera or a change from a normal image to a predetermined imaging pattern occurs within a predetermined time threshold.

18. The computer storage medium of claim 17, wherein the predetermined time threshold is shorter than a normal time interval for moving a camera from a light environment to a dark environment.

19. The computer storage medium of claim 15, wherein detecting the at least the partial obstruction of the first camera of the electronic device further comprises detecting a particular color based on blood vessels of a body component.

20. The computer storage medium of claim 15, wherein detecting the at least the partial obstruction of the first camera of the electronic device is enabled when the first camera and the second camera are not in use.

* * * * *